United States Patent
Min et al.

(10) Patent No.: US 11,960,271 B2
(45) Date of Patent: Apr. 16, 2024

(54) POWER PLANT EARLY WARNING DEVICE AND METHOD EMPLOYING MULTIPLE PREDICTION MODEL

(71) Applicant: KOREA HYDRO & NUCLEAR POWER CO., LTD, Gyeongsangbuk-do (KR)

(72) Inventors: Ji Ho Min, Sejong (KR); Dae Woong Kim, Sejong (KR); Do Hwan Lee, Daejeon (KR); Yun Goo Kim, Daejeon (KR)

(73) Assignee: KOREA HYDRO & NUCLEAR POWER CO., LTD, Gyeongsangbuk-do (KR)

( * ) Notice: Subject to any disclaimer, the term of this patent is extended or adjusted under 35 U.S.C. 154(b) by 98 days.

(21) Appl. No.: 17/279,118

(22) PCT Filed: Oct. 10, 2019

(86) PCT No.: PCT/KR2019/013272
§ 371 (c)(1),
(2) Date: Mar. 24, 2021

(87) PCT Pub. No.: WO2020/076083
PCT Pub. Date: Apr. 16, 2020

(65) Prior Publication Data
US 2021/0397176 A1    Dec. 23, 2021

(30) Foreign Application Priority Data
Oct. 12, 2018 (KR) .......................... 10-2018-0121645

(51) Int. Cl.
*G05B 23/02* (2006.01)
*H02J 3/00* (2006.01)

(52) U.S. Cl.
CPC ..... *G05B 23/0254* (2013.01); *G05B 23/0283* (2013.01); *H02J 3/004* (2020.01)

(58) Field of Classification Search
None
See application file for complete search history.

(56) References Cited

U.S. PATENT DOCUMENTS

2005/0222747 A1* 10/2005 Vhora ................ G05B 23/0254
701/31.4
2007/0288414 A1* 12/2007 Barajas .................. G06N 20/00
706/46

(Continued)

FOREIGN PATENT DOCUMENTS

| CN | 105318905 A | 2/2016 |
|---|---|---|
| CN | 107067092 A | 8/2017 |

(Continued)

OTHER PUBLICATIONS

Espacenet, machine translation of JP2006135412A, Tsujita Shinsuke et al., "Remote Supervisory System," May 25, 2006, downloaded on Aug. 18, 2022. (Year: 2006).*

(Continued)

*Primary Examiner* — Michael J Dalbo
*Assistant Examiner* — Denise R Karavias
(74) *Attorney, Agent, or Firm* — Occhiuti & Rohlicek LLP

(57) ABSTRACT

The present invention relates to a power plant early warning device and method which employ a multiple prediction model, and includes: a plurality of prediction models which receive information about the operation states of equipment in a power plant, and output prediction values and the reliabilities of the prediction values; a reliability analysis module which quantizes and analyzes the reliabilities output from the plurality of prediction models to determine the ranks of the plurality of prediction models, and calculates a (Continued)

final prediction value; a comparison module which compares the final prediction value with an actual measurement value, and outputs a residual; and a determination module which analyzes the residual to determine whether there are defects in the operating states of the equipment in the power plant.

6 Claims, 4 Drawing Sheets

(56) References Cited

U.S. PATENT DOCUMENTS

2018/0203439 A1 7/2018 Hattori et al.
2019/0101908 A1* 4/2019 Park .................... G05B 23/024

FOREIGN PATENT DOCUMENTS

| CN | 108492026 A | 9/2018 |
|----|----|----|
| CN | 108604360 A | 9/2018 |
| EP | 3454289 A1 | 3/2019 |
| JP | 2000018145 A | 1/2000 |
| JP | 2015172945 A | 10/2015 |
| KR | 20040110645 A | 12/2004 |
| KR | 20060055771 A | 5/2006 |
| KR | 20170022113 A | 3/2017 |
| KR | 10-2018-0024333 A | 3/2018 |
| WO | 17/191872 A1 | 11/2017 |
| WO | 18/160177 A1 | 9/2018 |

OTHER PUBLICATIONS

Espacenet, machine translation of WO2018/160177A1, Chanda et al., "Predictive Anomaly Detection Framework," Sep. 7, 2018, downloaded on Aug. 19, 2022. (Year: 2018).*

Espacenet machine translation, Kim Dae Woong, KR20180024333A, "Device Abnormality Presensing Method and System Using Thereof" Mar. 8, 2018 (Year: 2018).*

Jung Woon Lee et al. "Development of Fault Detection and Diagnosis System for the Water Level Measurement Sensor in PWR Steam Generator," KAERI, 2004.

Choi, Hyungwon, "Exploiting Hierarchical Structure of Classes in Object Classification using Deep Convolutional Neural Networks," Master's Thesis, KAIST, 2015.

Extend European Search Report, dated Jun. 1, 2022 (9 Pages).

* cited by examiner

POWER PLANT EARLY WARNING DEVICE AND METHOD EMPLOYING MULTIPLE PREDICTION MODEL

TECHNICAL FIELD

The present disclosure relates to a power plant early warning apparatus and method employing a multiple prediction model, and more particularly, to power plant early warning apparatus and method for detecting a defect and increasing reliability by applying a multiple prediction model.

BACKGROUND ART

The early warning device is a system used to prevent an equipment failure in advance, and has been widely introduced and used in military, aviation, and power generation fields.

The principle of the early warning device is a method in which a prediction model creates a prediction value for an operating state using previous normal operation data, calculates a residual by comparing the prediction value with an actual measurement value, and causes a warning to occur when the residual is out of the normal operation range.

Various mathematical methods are used to calculate prediction values for the operating states of equipment, and representative methods thereof include Kernel regression using a statistical method, Gaussian process regression, a neural network method, Kalman filter, etc.

The early warning device can have a practical effect only when the probability of false warnings is minimized Otherwise, an operator may miss important warnings while analyzing a large number of warnings, and the operator's concentration may be degraded, failing to detect a warning that is caused by a real equipment problem.

Conventionally, a single prediction model has been used. This will be described with reference to FIG. 1.

FIG. 1 is a diagram schematically showing the configuration of an early warning device employing a single prediction model in a related art.

As shown in FIG. 1, a measured signal is transmitted to the single prediction model, and a prediction value is calculated in the single prediction model. This prediction value is transmitted to a comparison module, and the comparison module compares the prediction value and an actual measurement value to output a residual, and determines whether the determination module is in a normal range to determine whether there are defects.

In this case, the reliability of a detected defect was low and there was a defect that could not be detected due to characteristics of the prediction model, and accordingly, a method of applying the prediction model in multiple to increase the reliability of the prediction model is being studied.

DISCLOSURE

Technical Problem

The present disclosure is to solve the problems of the prior art as described above, and an object thereof is to increase the reliability for early warning by applying a multiple prediction model.

Technical Solution

In order to achieve the above object, the present disclosure provides a power plant early warning device employing a multiple prediction model, and the device includes: a multiple prediction model comprising a plurality of prediction models which receives information on operating states of equipment of a power plant and outputs prediction values and reliabilities of the prediction values; a reliability analysis module which quantifies and analyzes the reliabilities output from the multiple prediction model to determine ranks of the plurality of prediction models included in the multiple prediction model, and calculates a final prediction value; a comparison module which compares the final prediction value with an actual measurement value and outputs a residual; and a determination module which analyzes the residual and determines whether there are defects in the operating states of the equipment of the power plant.

Here, when calculating the final prediction value, the reliability analysis module may use a prediction value of a predicted model having a highest rank.

Further, when calculating the final prediction value, the reliability analysis module may use an arithmetic mean of two highest prediction values.

Further, when calculating the final prediction value, the reliability analysis module may apply weights according to the ranks.

In addition, all the plurality of prediction models in the multiple prediction model use a same algorithm, while the algorithm is applied differently for each operating condition.

Further, the multiple prediction model may apply different algorithms to the plurality of prediction models.

Meanwhile, in order to achieve the above object, the present disclosure provides a power plant early warning method employing a multiple prediction model, and the method includes: receiving information on operating states of equipment of a power plant and outputting prediction values and reliabilities of the prediction values by a multiple prediction model comprising a plurality of prediction models; quantifying, by a reliability analysis module, the reliabilities output from the multiple prediction model; determining, by the reliability analysis module, ranks of the plurality of prediction models included in the multiple prediction model and calculating a final prediction value; comparing, by a comparison module, the final prediction value with an actual measurement value and outputting a residual; and analyzing, by a determination module, the residual to determine whether there are defects in the operating states of the equipment of the power plant.

Advantageous Effects

The early warning device and method according to the present disclosure has the following effects.

First, it is possible to overcome the weaknesses that occur in a single prediction model. The early warning device according to the present disclosure uses multiple prediction models rather than a single prediction model. Accordingly, a case in which a prediction value may be different from an actual value due to defects in each prediction model can be compensated for, thereby overcoming the vulnerability.

Second, it increases reliability. In the present disclosure, a multiple prediction model is applied to perform early warning for operating states of devices of a power plant. Accordingly, it is possible to enhance the capability of detecting defects than a single prediction model and to increase the reliability of early warning.

DETAILED DESCRIPTION OF MAIN ELEMENTS

Figure 1:
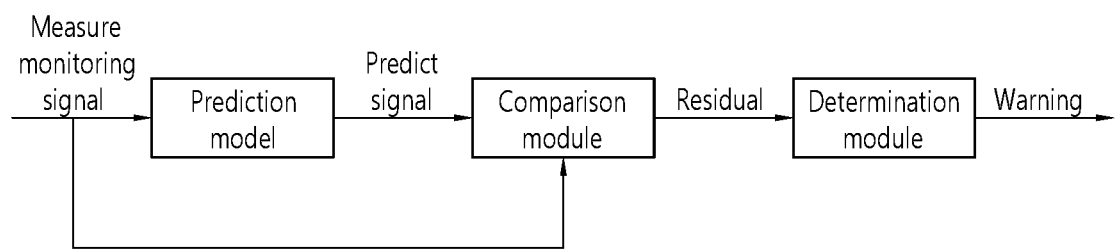
FIG. 1 is a diagram schematically showing the configuration of an early warning device employing a single prediction model in a related art.

100: signal measurement unit
200: multiple prediction model
210: first prediction model
220: second prediction model
300: reliability analysis module
400: comparison module
500: determination module

MODE FOR DISCLOSURE

Hereinafter, preferred embodiments of the present disclosure will be described with reference to the accompanying drawings. However, although some configurations unrelated to the spirit of the present disclosure will be omitted or compressed, the omitted configurations are not necessarily needless in the present disclosure and may be combined and used by those skilled in the art.

Figure 2:
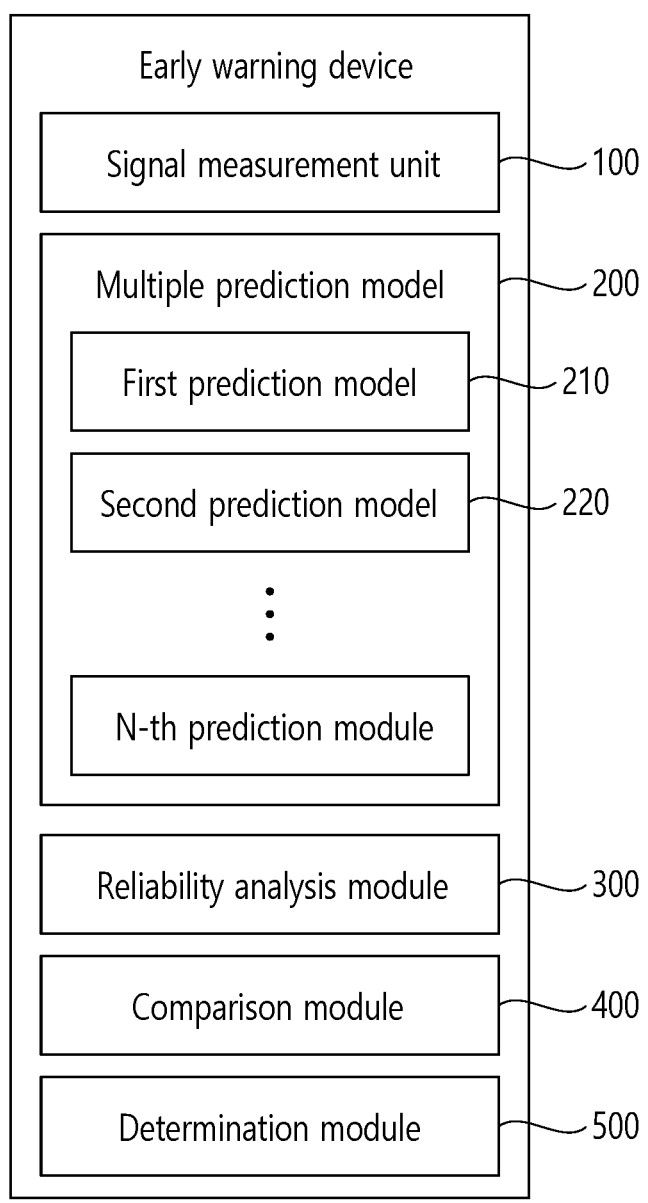
FIG. 2 is a block diagram of a power plant early warning device employing a multiple prediction model according to an embodiment of the present disclosure.
Figure 3:
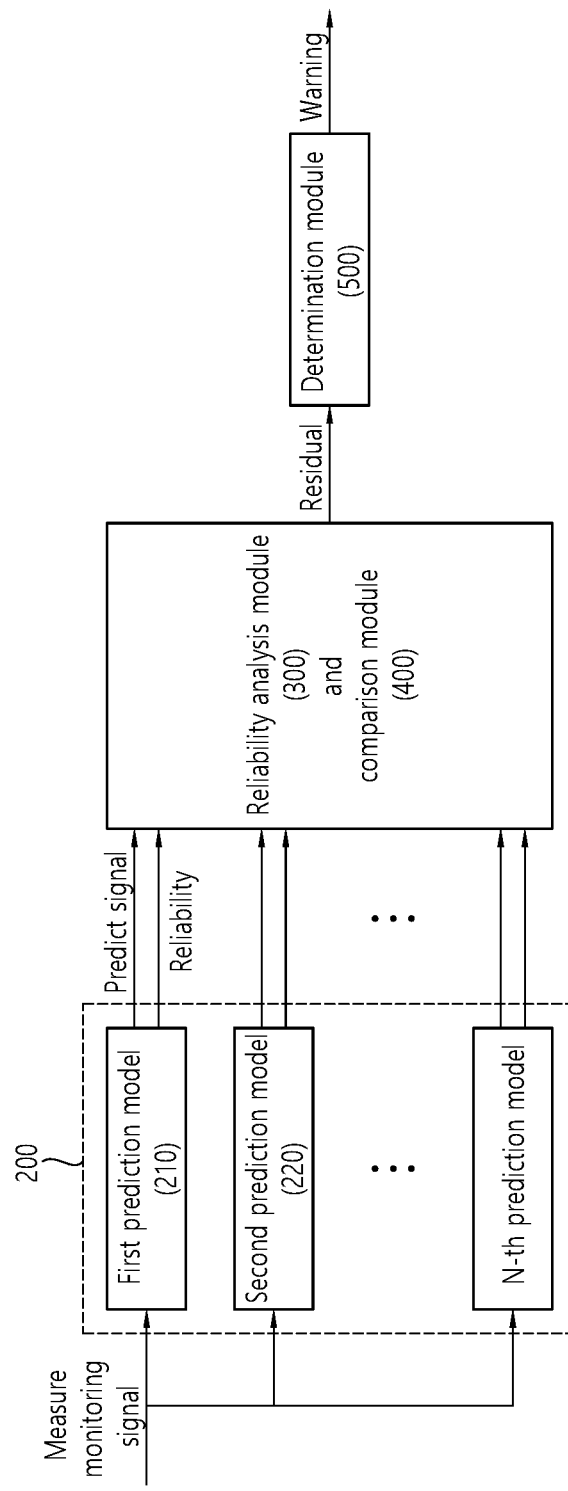
FIG. 3 is a diagram schematically illustrating a function performance between components of a power plant early warning device employing a multiple prediction model according to an embodiment of the present disclosure.

FIG. 2 is a block diagram of a power plant early warning device to which multiple prediction models are applied according to an embodiment of the present disclosure, and FIG. 3 is a diagram schematically illustrating a function performance between components of a power plant early warning device to which a multiple prediction models are applied according to an embodiment of the present disclosure.

As shown in FIGS. 2 and 3, a power plant early warning device employing multiple prediction model according to an embodiment of the present disclosure may include a signal measurement unit 100, multiple prediction model 200, a reliability analysis module 300, a comparison module 400, and a determination module 500.

The signal measurement unit 100 is configured to receive monitoring signals related to operating states of devices of a power plant, calculate an actual measurement value, and transmit the actual measurement value. Monitoring signals related to the operating states of the devices of the power plant are related to pressure, temperature, flow data, etc. The signal measurement unit 100 is attached to the power plant equipments or around them to measure and transmit the operating states of the equipment. A transmission interval may be set by a user. For example, it is possible to transmit the signal at an interval of one second.

The multiple prediction model 200 is configured to receive a monitoring signal received by the signal measurement unit 100 and generate a prediction value for an operating state of the equipment. In the multiple prediction model 200, a plurality of prediction models of 1 to n number may be used.

That is, different algorithms may be applied to a first prediction model 210, a second prediction model 220, . . . , and an n-th prediction model, and each prediction model outputs a prediction value of a current monitoring signal and a reliability of the prediction value.

The reliability analysis module 300 is configured to receive a reliability of a prediction value from each prediction model and quantify and analyze the received reliabilities to determine ranks of the prediction models.

The comparison module 400 is configured to calculate a final prediction value according to a user's setting, compare the final prediction value with an actual measurement value, and output a residual. Here, for the final prediction value, a prediction value of a prediction model having a highest rank may be used, an arithmetic mean of two highest prediction values may be used, or a weighted average according to the ranks may be used.

The determination module 500 is configured to analyze a residual output from the comparison module 400 to determine whether there are defects in the operating states of the power plant equipment.

Hereinafter, a power plant early warning method employing the multiple prediction model 200 will be described with reference to the drawings.

Figure 4:
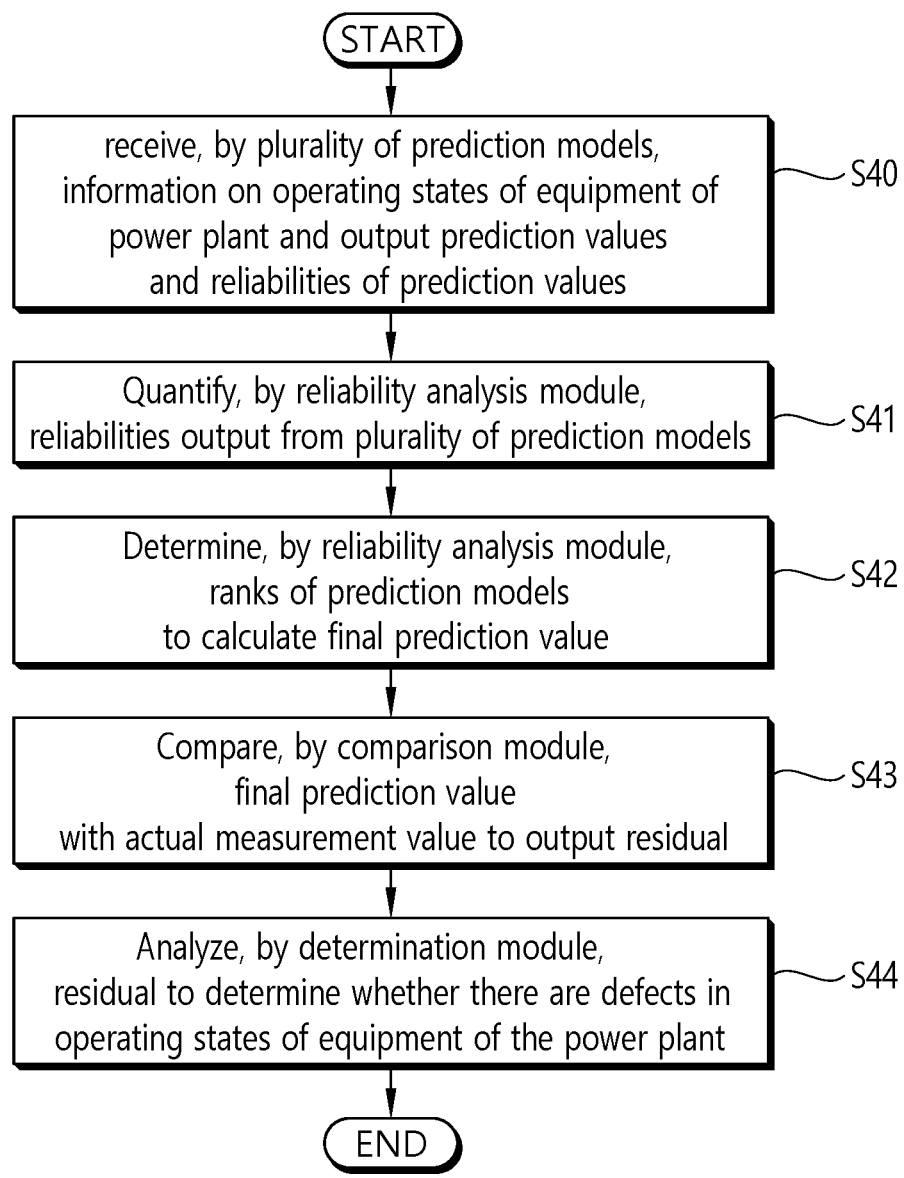
FIG. 4 is a flowchart of a power plant early warning method employing a multiple prediction model according to an embodiment of the present disclosure.

FIG. 4 is a flowchart of a power plant early warning method employing a multiple prediction model according to an embodiment of the present disclosure.

As shown in FIG. 4, in the power plant early warning method employing a multiple prediction model according to an embodiment of the present invention, a plurality of predictive model first receives information on the operating states of equipment of a power plant and outputs prediction values and reliabilities of the prediction values. <S40>

The signal measurement unit 100 receives a monitoring signal regarding the operating state of the equipment of the power plant. Since the received monitoring signal is an analog signal, the signal measurement unit 100 may process data to perform an analog-to-digital conversion, so that the monitoring signal can be converted into a digital signal. The signal measurement unit 100 may transmit actual measurement values of the monitoring signals converted into the digital signals to the comparison module 400.

In addition, the multiple prediction model 200 composed of a plurality of prediction models outputs a prediction value of a corresponding equipment among the equipments of the power plant measured by the signal measurement unit 100. Depending on the use, such a plurality of prediction models may be used from the first prediction model 210, the second prediction model 220, . . . , up to the n-th prediction model.

The first prediction model 210, the second prediction model 220, . . . , and the n-th prediction model may output prediction values of equipment by applying different algorithms.

For example, the first prediction model 210 may use a data model using the Auto Associative Kernel Regression (AAKR) technique, and the second prediction model 220 may use a physical model using Kalman filter. Accordingly, the first prediction model 210 may output a prediction value using the AAKR technique, and the second prediction model 220 may output a prediction value using the Kalman filter.

Specifically, the AAKR technique generates a pattern model by learning previous data, determines a similarity by comparing a current actual measurement value and the pattern model, and generates a prediction value by weighting the pattern model based on the similarity. Therefore, the AAKR technique is an interpolation-type prediction model, which can be predicted within the learned pattern model and can be predicted only when a measurement value exists in a learned pattern model. In determining the similarity, it is possible to check whether the measurement value exists in a learned pattern region, and a reliability of a prediction value may be calculated by taking such similarities into account.

When a prediction model to which a plurality of AAKR techniques are applied is applied, each AAKR model may output a prediction value and a reliability. Here, the reliability refers to a similarity between an actual measurement value and a pattern model.

The Kalman filter is a statistical model based on a physical model and may output a prediction value and a covariance. Such a Kalman filter may be predicted even in a not-learned region, and an uncertainty (reliability) of a prediction value may be determined through the covariance.

After the prediction value is output, the first prediction model 210, the second prediction model 220, . . . , and the n-th prediction model may output a reliability of each prediction value. At this point, the size and meaning of reliability, and calculation methods may differ for each algorithm.

A reliability is an index that roughly indicates how accurate a prediction value output for a corresponding equipment from the first prediction model 210, the second prediction model 220, . . . , and the n-th prediction model.

In addition, similarly to that the first prediction model 210, the second prediction model 220, . . . , and the n-th prediction model all use the AAKR technique or the Kalman filter, the first prediction model 210, the second prediction model 220, . . . , and the n-th prediction model may all use the same algorithm. Even if the same algorithm is used, a plurality of prediction models may be used for each operating condition of the device.

For example, in consideration of changes in seawater temperature, prediction models for temperatures of four surface condensers each per season are composed of the first prediction model 210, the second prediction model 220, a third prediction model (not shown), and a fourth prediction model (not shown), and the first prediction model 210, the second prediction model 220, the third prediction model, and the fourth prediction model output prediction values by applying the AAKR technique only.

Here, a surface condenser is an equipment for cooling water vapor to return the vapor to water, and is a kind of generally well-known condenser.

Seawater is the ultimate heat sink of a power plant, and almost all of the heat generated in nuclear power plants is discharged into the seawater. Therefore, when the temperature of the seawater changes, the heat exchange process between the power plant and the seawater changes, and as a result, the operation pattern of almost all facilities changes. One of the facilities affected by the seawater temperature is the condenser.

While operating an early warning system at a nuclear power plant, there was a case where a large number of false warnings occurred in the summer of 2016 due to an abnormal high temperature of the seawater (a temperature increase of 2 degrees compared to learning data of average year). Accordingly, in an existing single prediction model, a prediction range of the prediction model is increased by additionally learning data on the changed seawater temperature, or the warning sensitivity is reduced through a change that increases the allowable value of the determination module 500.

However, this method is not desirable because the overall reliability and detection capability of the early warning device is reduced. Therefore, the multiple prediction model 200 based on the four AAKR techniques for each seawater temperature is applied, thereby learning each operation pattern of nuclear power plant variables according to the seawater temperature.

That is, a prediction model for spring, a prediction model for summer, a prediction model for autumn, and a prediction model for winter are generated. Thereafter, when a measurement value is input, it is determined which season-related prediction model is most similar, and a prediction value of the most similar prediction model is used.

As a result, since prediction is performed using a plurality of precise prediction models each having a narrow prediction range, the reliability of the early warning device is improved than before.

On the contrary, a prediction model to which the AAKR method is applied and a prediction model to which the Kalman filter is applied may be used together, and the prediction model to which the AAKR method is applied outputs a similarity as a reliability, and the prediction model to which the Kalman filter is applied outputs a covariance, and therefore, a prediction value and the reliability may be output.

Thereafter, the reliability analysis module 300 quantifies reliabilities output from the plurality of prediction models. <S41>

By using a normal distribution or the like of the reliabilities of the prediction values output from the first prediction model 210 and the second prediction model 220, the reliability analysis module 300 quantifies the respective reliabilities, so that the reliabilities can be compared on the same basis.

Next, the reliability analysis module 300 determines ranks of the plurality of prediction models and calculates a final prediction value. <S42>

The reliability analysis module 300 determines the ranks of the prediction models based on the reliabilities output from the first prediction model 210, the second prediction model 220, . . . , and the n-th prediction model. This is to determine a prediction model that outputs a prediction value that the most matches a corresponding equipment among the first prediction model 210, the second prediction model 220, . . . the n-th prediction models by applying difference according to the value of the quantified reliability.

In the multiple prediction model 200 in which the AAKR technique is applied to all of the plurality of prediction models, since a similarity includes influences such as a signal magnitude or fluctuation range, it is not possible to directly compare similarities between prediction models. Therefore, the reliability analysis module 300 quantifies the similarity and then compares and analyzes the similarity to determine the ranks of the prediction models.

By applying a prediction model composed of data that is the most similar to the operating state of a nuclear power plant, the accuracy of the prediction values may be increased, thereby preventing a false warning. In addition, when an existing single prediction model is used, a work to modify and supplement the prediction model in response to a change in the environment is needed, and the work may be minimized by applying a plurality of prediction models.

In addition, the multiple prediction model 200 in which the AAKR technique and the Kalman filter are applied to the plurality of prediction models quantifies different reliabilities between algorithms to enable comparison, and then arrange the quantified reliabilities to determine ranks of the prediction models.

By applying these different algorithms, it is possible to prevent inaccuracy of a prediction value due to weakness of the algorithms.

In this way, when the ranks of the prediction models among the first prediction model 210, the second prediction model 220, . . . , and the n-th prediction model are determined, a final prediction value may be calculated according to a user's setting.

For example, a prediction value of a prediction model having a highest rank may be used to determine the final prediction value.

In addition, the final prediction value may be determined by using an arithmetic mean of two highest prediction values. That is, if a prediction value of the first prediction model 210 among the first prediction model 210, the second prediction model 220, . . . , and the n-th prediction model and a prediction value of the second prediction model 220 are determined the highest value and the second highest value, respectively, a value derived by calculating an arithmetic mean of the prediction value of the first prediction model 210 and the prediction value of the second prediction model 220 may be used as a final prediction value.

In addition, an average of prediction values to which weights are applied according to the rank determined for the first prediction model 210, the second prediction model 220, . . . , and the n-th prediction model may be determined as a final prediction value.

Next, the comparison module 400 compares the final prediction value with an actual measurement value and outputs a residual. <S43>

The residual is calculated using a difference between a current value (or the actual measurement value) and a prediction value of a corresponding equipment. That is, the residual may be calculated and output through |current value-prediction value|.

The determination module 500 analyzes the residual to determine whether there are defects in the operating states of equipment of the power plant. <S44>

The determination module 500 determines whether a monitoring signal for a corresponding equipment is included in a preset normal operation range based on the residual output from the comparison module 400.

Here, the normal operation range may be determined differently according to a user's setting. Therefore, if the residual is a value outside the preset normal operation range, the monitoring signal for the corresponding equipment determines that the device is in an abnormal operating state and generates an early warning, and if the residual is a value that does not exceed the preset normal operation range, a warning is not generated.

At this point, a user may adjust the normal operation range for generating the warning.

For example, the normal operation range of a feed water pump is 45 (at minimum) to 55 (at maximum), and the deviation between the minimum value and maximum value is 10.

Therefore, in a case where it is programmed to generate a warning when the residual exceeds 30% (+3, −3) of the deviation (10) of the normal operating range, if an input measurement value is 60 and a calculated prediction value is 52, the residual is 8 which exceeds 30% of the deviation and thus a warning is generated.

On the contrary, if a measurement value is 43 and a prediction value is 45, the residual is 2 and thus and a warning is not generated.

When a warning is generated, the determination module 500 may transmit warning status information to an integrated center equipment (not shown) for monitoring all power plants, so that a user can check it.

As described above, in the present disclosure, the multiple prediction model 200 is used to output a plurality of prediction values and a plurality of reliabilities based on monitoring signals of equipments, and a residual is output by comparing a prediction value having a high rank according to a reliability thereof with an actual measurement value, and an early warning is generated by determining whether the output residual is included in a normal operation range.

While the preferred embodiments of the present disclosure have been disclosed for illustrative purposes, those skilled in the art will appreciate that may variations, modification, and addition may be made without departing from the scope and spirit of the present disclosure, and that such variation, modification, and additions are encompassed in the appended claims.

The invention claimed is:

1. An apparatus comprising a power plant early warning device for installation in a power plant, the power plant early warning device being configured for determining whether there exist defects in operation states of equipment in the power plant, wherein the power plant early warning device comprises a signal measurement unit that receives monitoring signals that are related to operating states of equipment in the power plant, the operating states including one of pressure, temperature, and flow data, the signals being analog signals, wherein the signal measurement unit is attached to the equipment in the power plant to measure and transmit operating states of the equipment during each of a plurality of transmission intervals and wherein the signal measurement unit carries out analog-to-digital conversion to transmit a digital signal, wherein the power plant early warning device is configured to receive information on operating states of equipment of a power plant from the signal measurement unit and to output at least three prediction values and at least three reliabilities, each of which corresponds to one of the prediction values, to quantify and analyze the reliabilities to determine at least three ranks, each of which corresponds to one of the three prediction values, to calculate a final prediction value by applying weights according to the ranks of the prediction values, to compare the final prediction value with an actual measurement value provided by the signal measurement unit, to output a residual, to analyze the residual to determine whether a defect exists in an operating state of the equipment of the power plant, and to cause a warning to occur when the residual is outside of a normal range.

2. The apparatus of claim 1, wherein among the ranks of the prediction values is a highest rank and wherein applying weights according to the ranks of the prediction values comprises using the highest rank when calculating the final prediction value.

3. The apparatus of claim 1, wherein the final prediction value is calculated using an arithmetic mean of two highest ranking prediction values.

4. The apparatus of claim 1, wherein all the prediction values are determined by using a particular algorithm and wherein the algorithm is applied differently for each operating state.

5. The apparatus of claim 1, wherein the prediction values are determined using different algorithms.

6. The apparatus of claim 1, further comprising the power plant.

* * * * *